United States Patent [19]

Swider et al.

[11] Patent Number: 5,419,880

[45] Date of Patent: May 30, 1995

[54] CONTROLLED ACID-STRONG ACID STRIP PROCESS

[75] Inventors: Richard C. Swider, Toronto; Steven A. Webster, Peterborough, both of Canada

[73] Assignee: Falconbridge, Ltd., Canada

[21] Appl. No.: 133,305

[22] Filed: Oct. 8, 1993

[51] Int. Cl.$^6$ .................... B01D 11/00; C01G 56/00; C22B 60/02

[52] U.S. Cl. .......................... 423/9; 423/7; 423/20; 423/253; 210/638

[58] Field of Search .................. 423/7, 20, 9, 253; 210/638

[56] References Cited

U.S. PATENT DOCUMENTS

| | | | |
|---|---|---|---|
| 3,966,872 | 6/1976 | Sundar et al. | 423/9 |
| 3,980,750 | 9/1976 | Cousinou et al. | 423/9 |
| 4,155,982 | 5/1979 | Hunkin et al. | 423/7 |
| 4,238,457 | 12/1980 | Sialino et al. | 423/10 |
| 4,371,505 | 2/1983 | Pautrot | 423/10 |
| 4,500,493 | 2/1985 | Hurst, Jr. | 423/10 |
| 4,606,895 | 8/1986 | Paul | 423/7 |
| 5,219,533 | 6/1993 | Larson | 422/159 |

OTHER PUBLICATIONS

R. C. Merritt, "The extractive metallurgy of uranium", 1971, pp. 195–205.
E. Y. Scott, "Uranium milling at Bear Creek", presented at the 12th Annual Hydrometallurgical Meeting, Toronto, Ontario, Aug. 29–Sep. 1, 1982.
J. Delavaine, "Uranium milling at COMUF", presented at the 12th Annual Hydrometallurgical Meeting, Toronto, Ontario, Aug. 29–Sep. 1, 1982.
Neven et al., "Arsenic management and control at Key Lake", in Impurity Control and Disposal, proceedings of the 15th Annual Meeting of Hydrometallurgy Section of the Metallurgical Society, CIM, Vancouver, Aug. 1985.
W. W. Milde, "Milling and metallurgy", presented at the 90th Annual General Meeting of the Canadian Institute of Mining and Metallurgy in Edmonton, Alberta, May 1988.
H. A. Schnell, "Cluff Lake Mill–Phase 2 Expansion", presented at the 17th Canadian Mineral Processors Operators Conference in Ottawa, Ontario, 1985.
Ritcey et al., "Solvent Extraction: process and applications to process metallurgy", Process Metallurgy 1, Elsevier Scientific Publishing Company, 1979, 452–522.
Decesare et al., "The complete nuclear fuel cycle" in the proceedings of the International Symposium on Uranium and Electricity, Sep. 18–21, 1988, 3–16 to 3–23.
Crouse, "Controlled pH stripping of uranium from amines", U.S. Department of Commerce, National Technical Information Service, 1974.
Faure et al., Journal of ther South African Institute of Mining and Metallurgy, Mar. 1966, 319–327.

Primary Examiner—Donald P. Walsh
Assistant Examiner—Meena Chelliah
Attorney, Agent, or Firm—Fitzpatrick, Cella, Harper & Scinto

[57] ABSTRACT

A controlled multi-stage process for the stripping of uranium includes the introduction at one end of a solvent extraction device a uranium loaded organic solution. A concentrated stripping acidic aqueous solution is introduced at the other end of the solvent extraction device so that the aqueous solution and the organic solution are contacted counter-currently in the solvent extraction device at a temperature not substantially exceeding 35° C. Each stage of the multi-stage process includes the steps of: (a) separating partly stripped organic solution from the stripping aqueous solution; (b) adding acid to the stripping aqueous solution until the acid concentration is substantially that of the acidic aqueous solution introduced at the one end of the extraction device; (c) processing the partly stripped organic solution and the stripping aqueous solution of step (b) in the next stage, the next stage of the organic solution being in an opposite direction in the extraction device of the next stage of the aqueous solution; (d) repeating steps (a)-(c) until substantially all the uranium in the organic solution has been removed; and (e) recovering the uranium from the resulting pregnant stripping aqueous solution.

8 Claims, 6 Drawing Sheets

CONTROLLED ACID-STRONG ACID STRIP PROCESS

FIELD OF THE INVENTION

The present invention is concerned with an improvement of the current strong acid strip process commercially used in the uranium ore processing industry.

BACKGROUND OF THE INVENTION

Uranium is a metallic element of the actinide series currently used inter alia as fuel in nuclear reactors for electric power generation. Uranium is generally recovered from ores containing uraninite ($UO_2$), coffinite ($USiO_4OH$) or carnotite. The hexavalent uranium and uranyl ion ($UO_2^{++}$) are soluble in aqueous acidic solutions. Conventional recovery techniques from ore include leaching with sulphuric acid under oxidizing condition to obtain a uranyl sulphate solution, which is subsequently purified by solvent extraction and converted to uranium dioxide either in the natural or enriched form.

A technique well known in the uranium ore processing industry is the strong acid strip process. This process is used for the removal of uranium from organic solution during solvent extraction. Details of the process are displayed by Swider in "Stripping of Tertiary Amine for Uranium Recovery", presented at the International Symposium on Uranium and Electricity, Saskatoon, Canada, Sep. 18–21, 1988. The chemistry of the strong acid strip process is based on the chemical equilibrium of the species involved. The reactions for extraction of uranium involve an anionic extractant such as a tertiary amine, which is a component of a mixture of generally called "organic solution" or "organic phase", and comprises a tertiary amine such as a saturated straight chain trialkylamine, example of which being manufactured and sold by Henckel Corp. under the trademark Alamine 336, a modifier such as isodecanol, and a carrier such as kerosene. The chemistry of the extraction and subsequent stripping can be illustrated as follows:

Extraction:

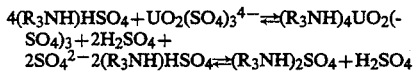

Stripping:

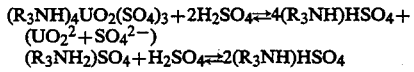

By increasing the acid concentration in the strip solution, uranium is transferred into the strip solution. A five stage typical counter-current mixersettler stripping plant is currently in commercial operation.

The performance of the current strong acid strip process is however subject to constraints. Acid transfer during stripping is a nominal 1 g $H_2SO_4$ per gram of $U_3O_8$ stripped. Further, a free acid strength must be maintained in the pregnant strip to preserve efficient stripping, an appropriate number of stages of contact is required to achieve process performance in terms of pregnant strip and stripped organic uranium concentration, and the degradation or de-activation of the organic solution must be controlled by avoiding excessive acid strength in the strip solution or excessive temperature during stripping contact.

Even though the above process has proved to give satisfactory results, improvement of the operating parameters of the process would certainly be desirable. For example, it would be most advantageous to improve the sulphuric acid to uranium oxide ratio, which is presently rather high.

SUMMARY OF THE INVENTION

In accordance with the present invention, there is provided an improvement to the current strong acid strip process, the improvement comprising controlling the acid concentration by acid addition at appropriate stages during the process. The direct result of this improvement is that the concentration of uranium in the pregnant stripping solution is increased by 4–6 times.

More specifically, the present invention is concerned with a controlled multi-stage process for the stripping of uranium, which comprises introducing at one end of a solvent extraction device, such as a mixer-settler bank or a column, a uranium loaded organic solution, and introducing a stripping acidic aqueous solution at the other end of the extraction device, so that the aqueous solution and the organic solution are contacted countercurrently in each stage of the extraction device; each stage comprising the steps of:

a) separating partly stripped organic solution from stripping aqueous solution;
b) adding acid to the stripping aqueous solution until the acid concentration is substantially that of the acidic aqueous solution introduced at the one end of the extraction device;
c) processing the partly stripped organic solution and the stripping aqueous solution of step b) in the next stage, the next stage of the organic solution being in an opposite direction in the extraction device of the next stage of the aqueous solution;
d) repeating steps a)–c) until substantially all the uranium in the organic solution has been removed; and
e) recovering the uranium from the resultant pregnant stripping aqueous solution.

IN THE DRAWINGS

DETAILED DESCRIPTION OF THE INVENTION

The controlled acid—strong acid strip process of the present invention is an improvement of the existing strong acid strip process.

Figure 1:
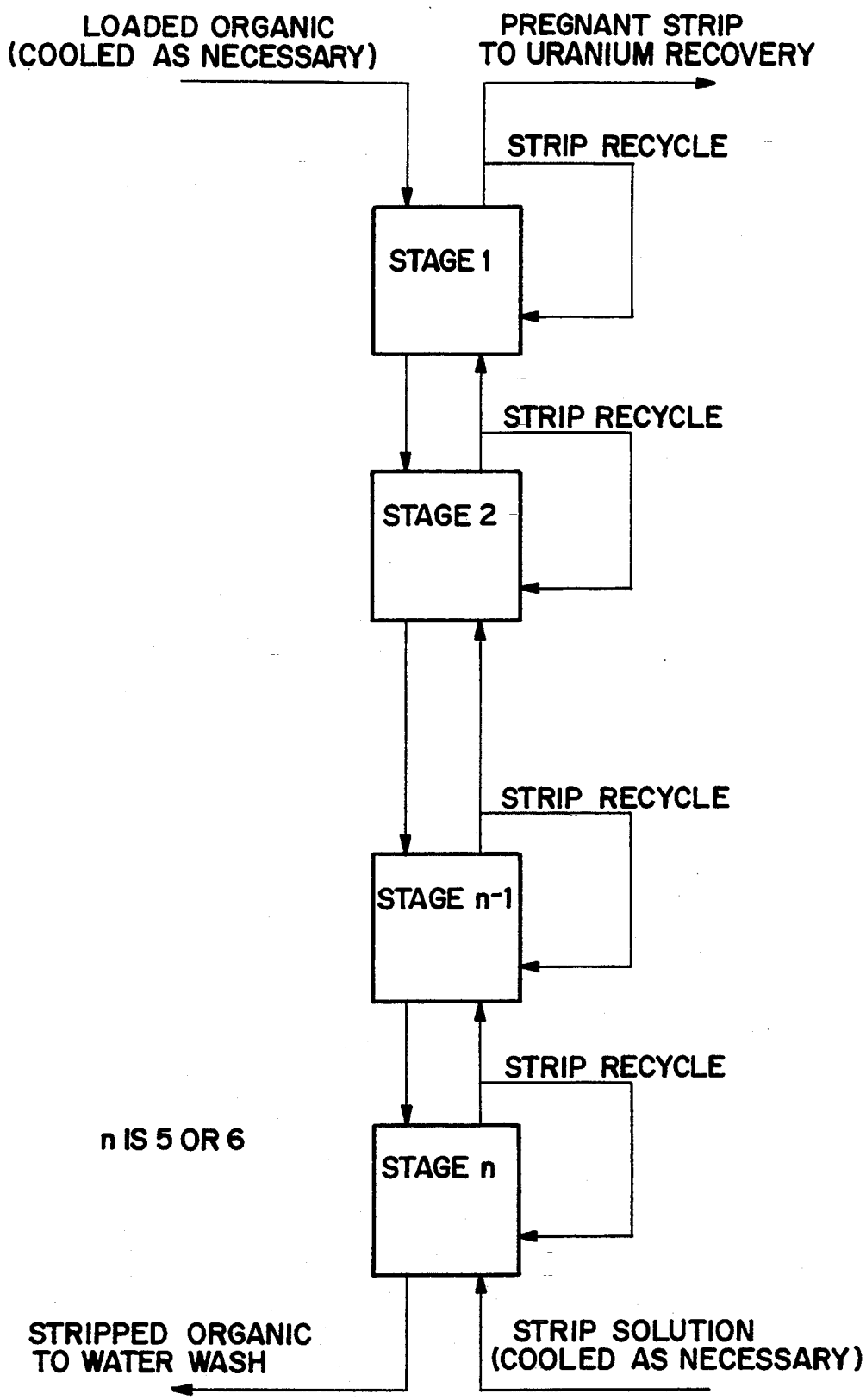
FIG. 1 illustrates a current strong acid strip circuit.
Figure 2:
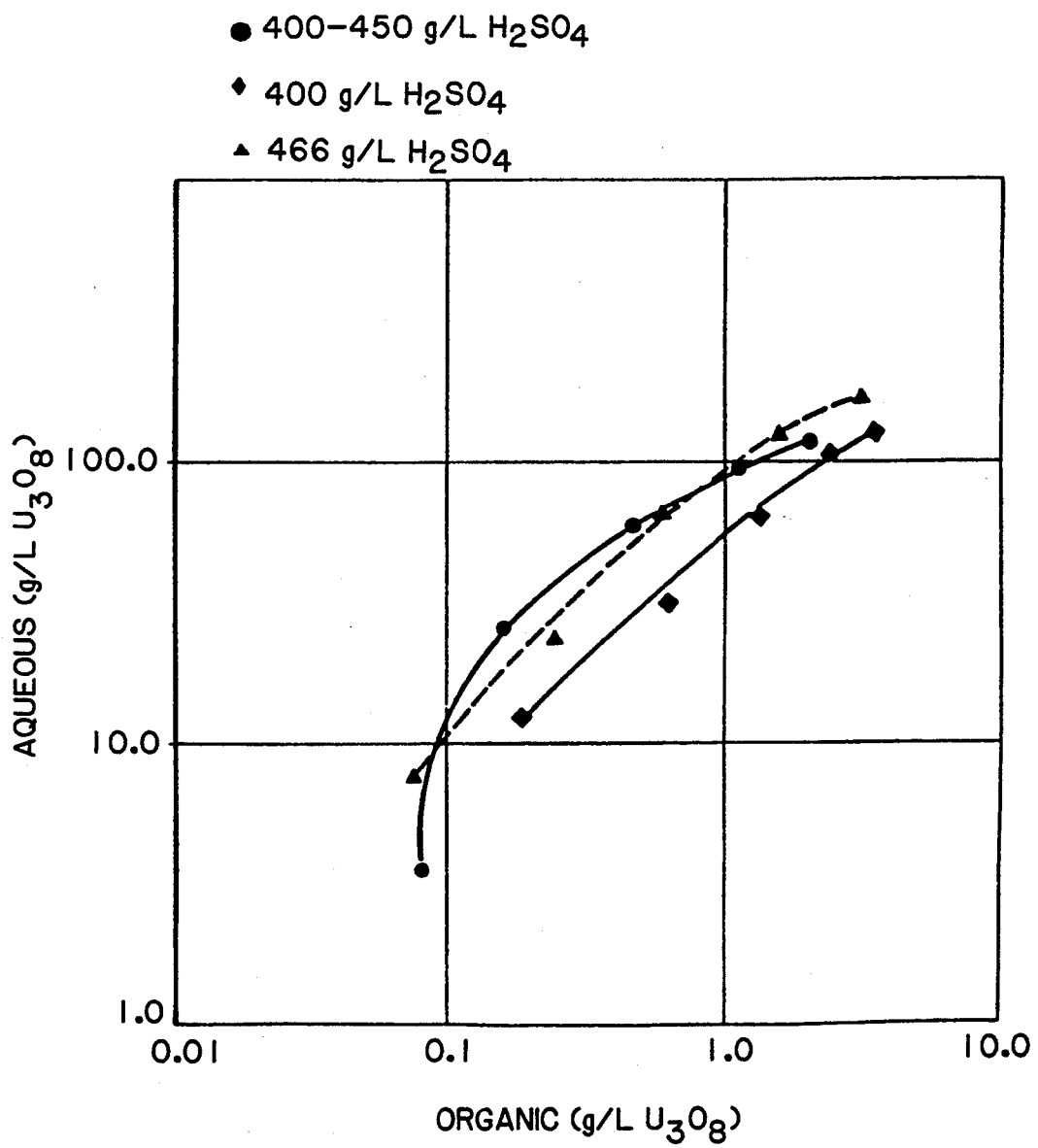
FIG. 2 illustrates the uranium oxide strip distribution in the aqueous and organic phases as a function of the concentration of sulphuric acid in the aqueous phase for the conventional strong acid strip process.

In the existing strong acid strip process, uranium loaded organic solution enters the first stage of the extraction device stripping circuit (or bottom of the column) and the strip solution, preferably aqueous sulphuric acid, enters the fifth or sixth stage (or top of the column) of the circuit, as illustrated in FIG. 1. The number of stages required is determined from the distribution data presented in FIG. 2 and the flow ratio of organic solution to aqueous strip solution.

In the case of mixer-settler bank as the extraction device, the organic and aqueous phases are mixed and pumped through the circuit by mixer-pumpers. Separation of phases is accomplished in the settler of each stage. Recycling of the aqueous phase within a stage is used to decrease the organic/aqueous ratio to improve contact during stripping. In the case of columns as the extraction device, the organic and aqueous phases are pumped into the columns, mixed, and separated by the column operations throughout the length of the column to bring the equivalent of a mixer-settler bank.

During the preparation of the fresh strip solution, sulphuric acid is added to water or to a water-acid solution to achieve the desired acid concentration. Heat is released because of heat of dilution of sulphuric acid and cooling is provided to obtain the required strip solution temperature. The circuit also includes provision for cooling the uranium loaded organic solution to maintain operating temperature at the appropriate level.

The resultant pregnant strip solution is then advanced to uranium recovery. The stripped organic is advanced to water wash for acid recovery and then recycled to extraction. A portion of the stripped organic might be treated with sodium carbonate solution in a regeneration stage, as might be necessary, to maintain process efficiency.

Figure 4:
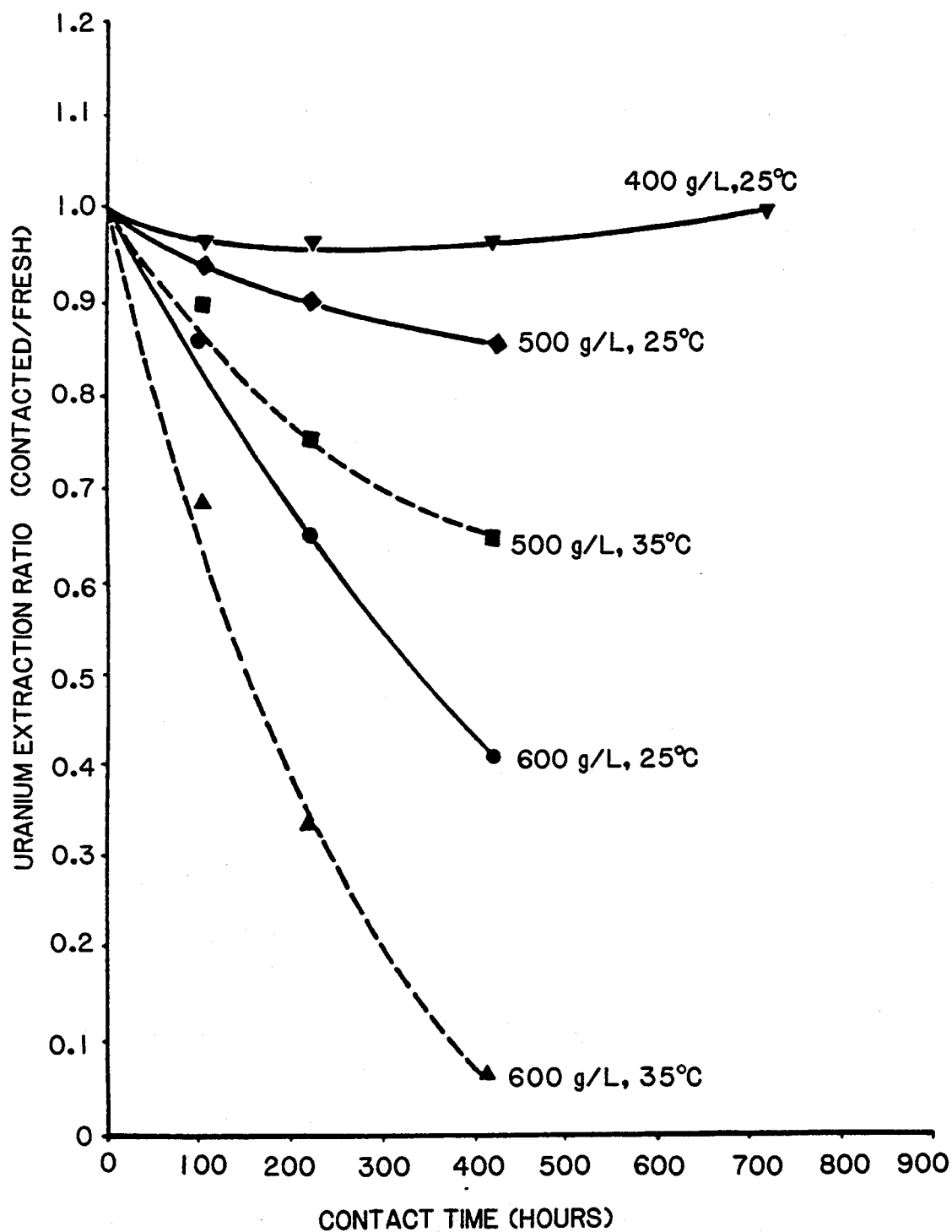
FIG. 4 illustrates the effect of temperature and acid strength on the organic solution.
Figure 5:
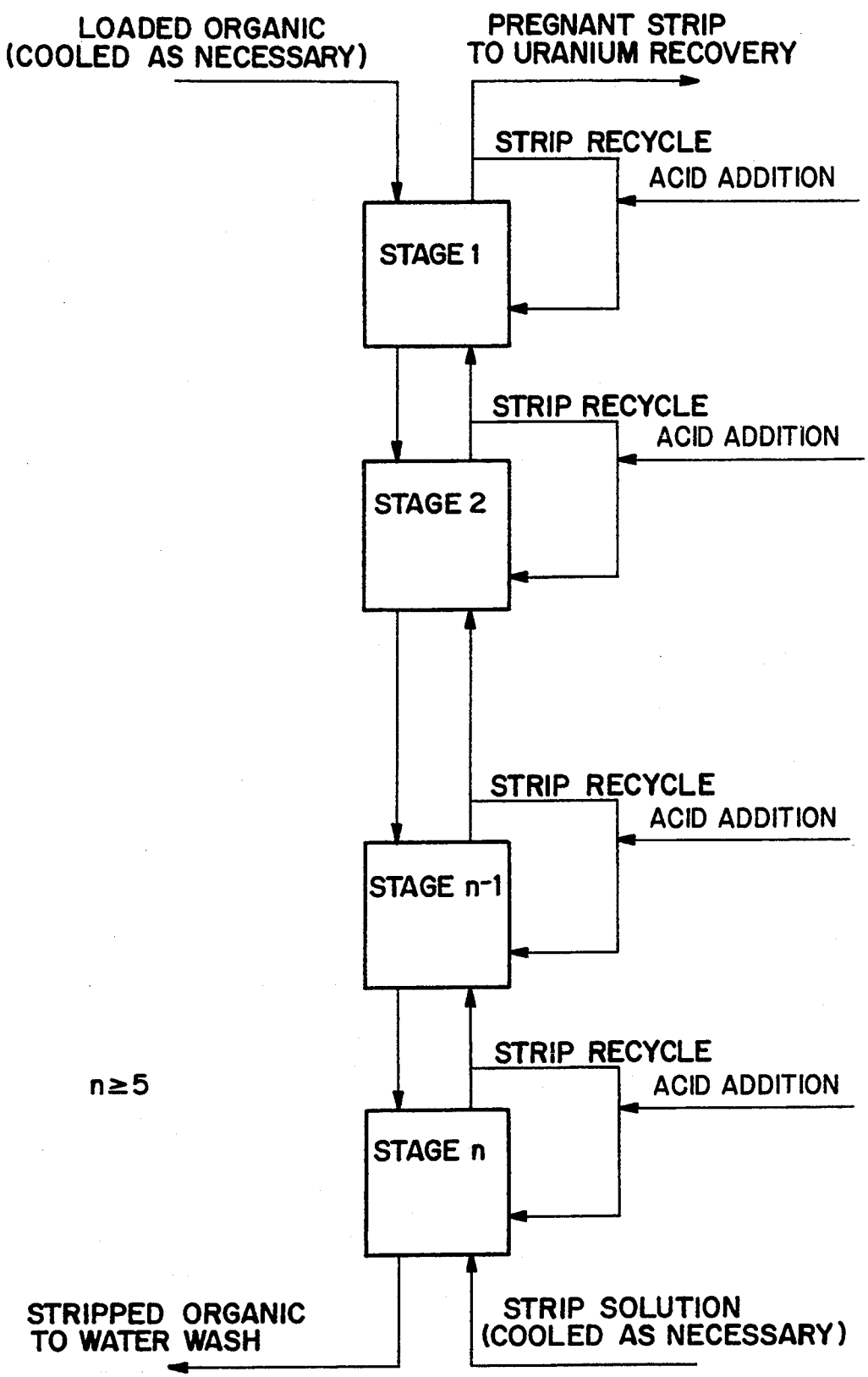
FIG. 5 illustrates the controlled acid—strong acid strip circuit of the process of the present invention.

The controlled acid—strong acid strip process of the present invention, as illustrated in FIG. 5, utilizes similar process equipment, that is mixer-settlers bank or columns. The aqueous strip solution is contacted countercurrent to the organic solution. The initial strip acid strength and temperature are consistent with the constraints illustrated in FIGS. 3 and 4. The flow ratio (advancing aqueous/advancing organic) is maintained to produce the desired pregnant strip uranium concentration.

At each stage in the case of mixer-settlers or appropriate position for a contact column the acid concentration of the aqueous strip solution is measured and adjusted back up to the selected strip acid concentration, consistent with the constraints, by the controlled addition of concentrated sulphuric acid. Conventional acid measurement and control instrumentation are used. Sufficient agitation is used during acid addition to provide a homogenous strip mixture. Cooling is provided if necessary to ensure the temperature constraints are not exceeded. In the case of mixer-settlers, the aqueous recycle stream is a convenient addition point for the acid.

The chemistry of the controlled acid—strong acid strip process of the present invention is identical to that of the previously described strong acid strip process.

Figure 6:
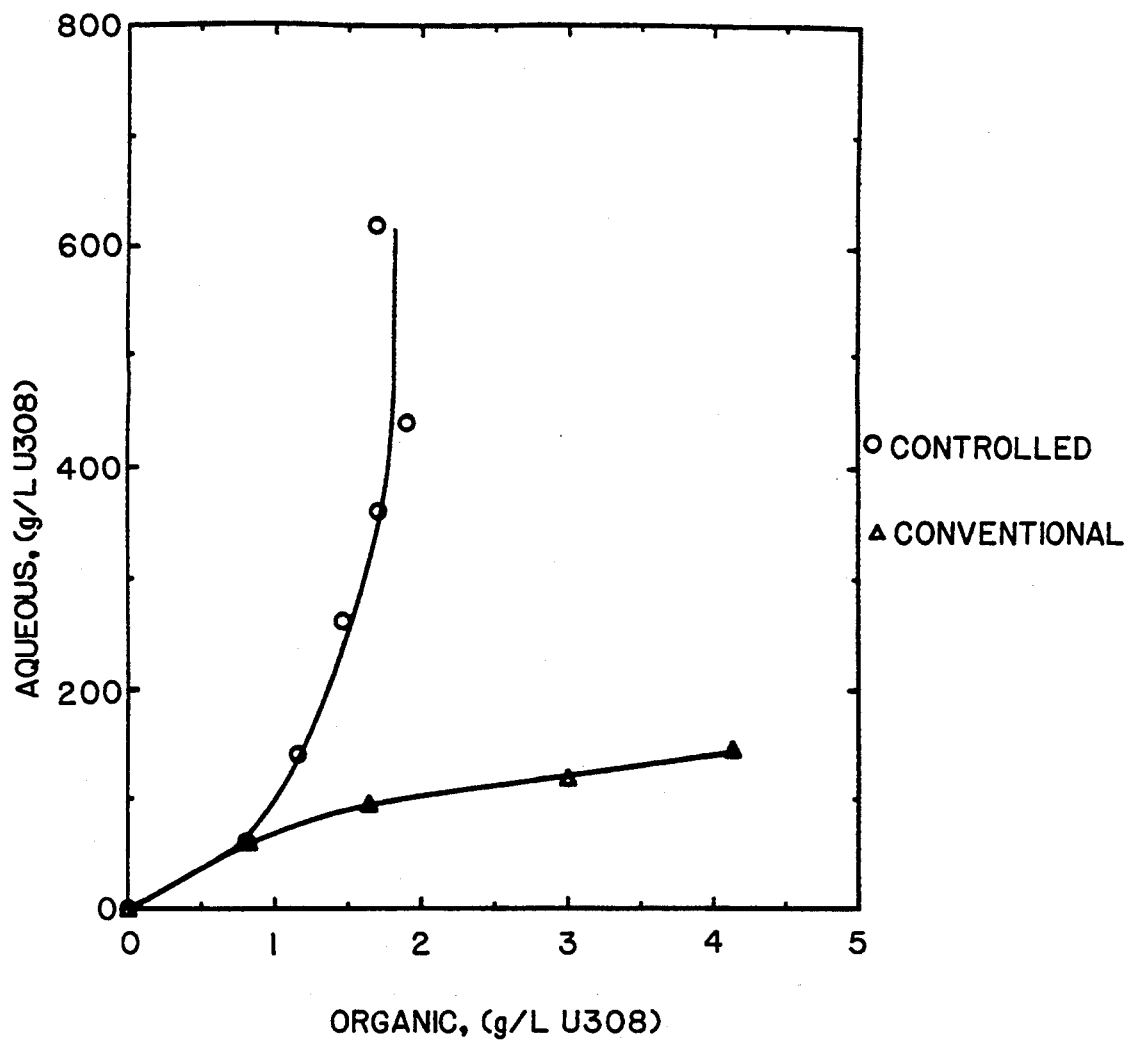
FIG. 6 illustrates the uranium oxide strip distribution for both the conventional strong acid strip process and the improved controlled acid—strong acid strip process of the present invention.

A standard set of stripping distribution curves for comparative purposes have been prepared for the controlled acid—strong acid strip process and the strong acid strip process, and are presented in FIG. 6. The data clearly demonstrate the benefits of controlled acid stripping. A uranium concentration of 620 g/L $U_3O_8$ in pregnant strip is obtained while maintaining a nominal strip acid concentration of 425 g/L $H_2SO_4$. The limit of uranium concentration in pregnant strip is the solubility of the uranium species at the solution conditions.

Figure 3:
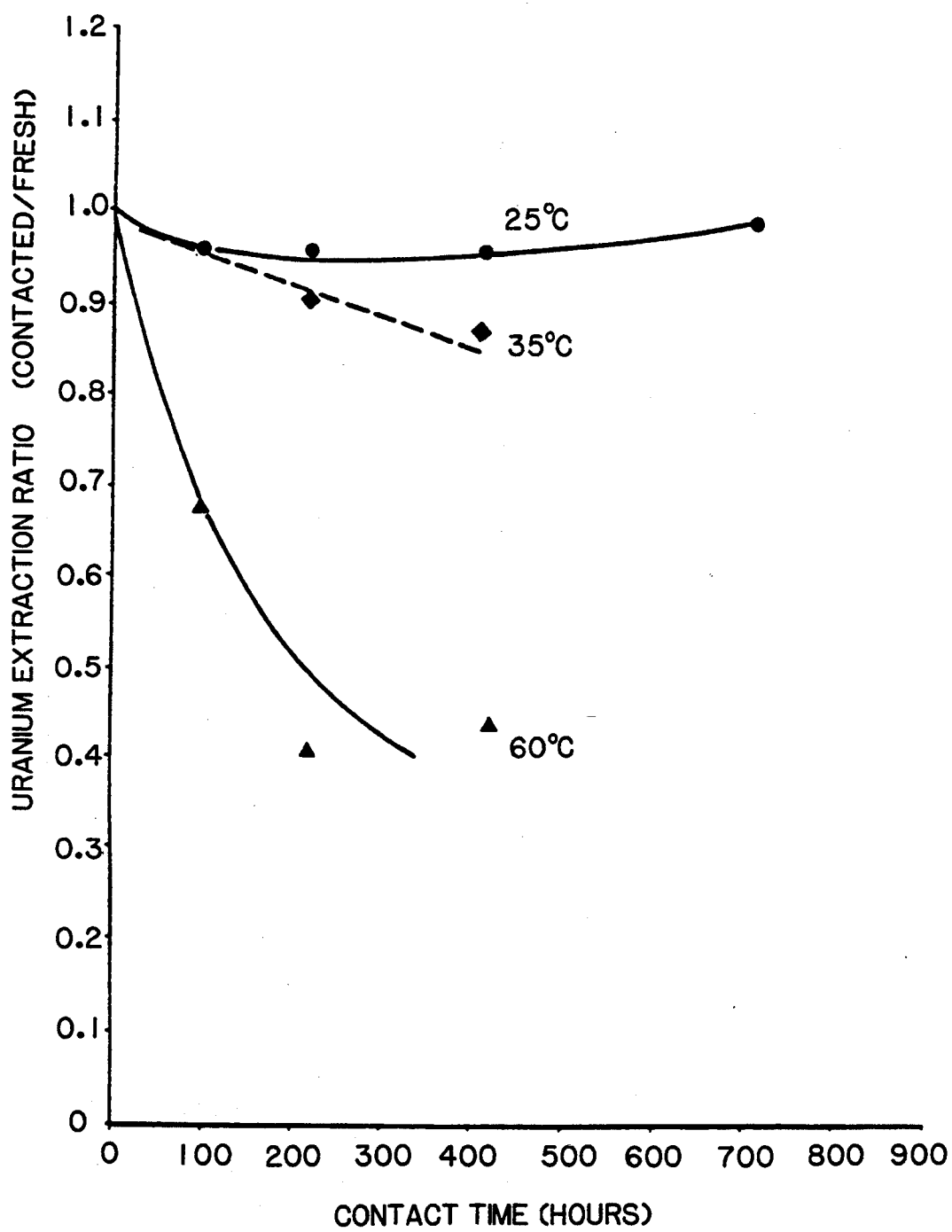
FIG. 3 illustrates the effect of temperature on the organic solution in the presence of a solution of 400 g/L of sulphuric acid.

The data presented in FIG. 6 and previous FIGS. 3 and 4, permit a set of preferred operating parameters to be selected for a controlled acid-strong acid strip process, which are shown in Table 1. For comparative purposes, the preferred parameters for the strong acid process are also presented.

TABLE 1

| Operating Parameters | Strong acid strip process | Controlled acid - strong acid strip process |
|---|---|---|
| Initial strip solution strength (g/L $H_2SO_4$) | 400–425 | 400–425 |
| Strip solution strength controlled throughout stages (g/L $H_2SO_4$) | — | 400–425 |
| $U_3O_8$ in pregnant strip (g/L) | 100–125 | ±620 |
| Free $H_2SO_4$ in pregnant strip (g/L) | 275–310 | 275–425 |
| Typical Overall $H_2SO_4/U_3O_8$ Ratio | 3.7–4.0 | 1.5–1.8 |
| Acid transfer (g $H_2SO_4$/g $U_3O_8$) | 1.0 | 1.0 |
| Stripping temperature (°C.) | 30 (<35) | 30 (<35) |

The above operating parameters are subject to the usual adjustments as appropriate for the site specific conditions and variances resulting from overall recovery plant operations and ore feeds. The adjustments can be easily achieved by anyone of ordinary skill in the art.

In an operating plant, the acid strength might not be adjusted in the last strip step (fresh strip solution feed end) because of the slight change in strip acidity because nearly depleted organic is contacted resulting in a small decrease in strip acidity. In addition, the acidity in the first strip stage (organic feed end) might not be adjusted to permit the acidity level in the pregnant strip to decrease, to improve the overall $H_2SO_4$ to $U_3O_8$ ratio.

The present improvement for the strong acid strip process of a split two stage water wash for recovery of transferred acid from stripped organic is also applicable to the controlled acid-strong strip process.

The economic advantage of the controlled acid—strong acid strip process is clearly evident. The controlled acid—strong acid strip process of the present invention results in an acid saving of a nominal 2 kg $H_2SO_4$/kg $U_3O_8$ and the corresponding saving in lime which is used to neutralize the free acid in pregnant strip solution, generally by gypsum precipitation, to permit uranium recovery using the current recovery process. The strip solution is also amenable to other uranium recovery processes such as crystallization and reduction.

While the invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains, and as may be applied to the essential features hereinbefore set forth, and as follows in the scope of the appended claims.

What is claimed is:

1. A controlled multi-stage process for the stripping of uranium, which comprises introducing at one end of a solvent extraction device a uranium loaded organic solution, and introducing a concentrated stripping acidic aqueous solution at the other end of the solvent extraction device, so that the aqueous solution and the organic solution are contacted counter-currently in the solvent extraction device at a temperature not substantially exceeding 35° C.; each stage comprising the steps of:

a) separating partly stripped organic solution from the stripping aqueous solution;

b) adding acid to the stripping aqueous solution until the acid concentration is substantially that of the acidic aqueous solution introduced at the one end of the extraction device;

c) processing the partly stripped organic solution and the stripping aqueous solution of step b) in the next stage, the next stage of the organic solution being in an opposite direction in the extraction device of the next stage of the aqueous solution;

d) repeating steps a)–c) until substantially all the uranium in the organic solution has been removed; and e) recovering the uranium from resultant pregnant stripping aqueous solution.

2. A process according to claim 1 wherein the acid in the acidic aqueous solution comprises sulphuric acid.

3. A process according to claim 1 wherein the organic solution contains an anionic extractant.

4. A process according to claim 1 wherein the solvent extraction device comprises a mixer-settler bank or a column.

5. A process according to claim 1 which comprises at least 5 stages.

6. A process according to claim 4 wherein the solvent extraction device comprises a mixer-settler and pregnant stripping aqueous solution is recycled after each stage to improve contact during stripping.

7. A process according to claim 3 wherein the anionic extractant comprises a tertiary amine.

8. A process according to claim 2, wherein the concentration of sulfuric acid is at least 275 g/L.

* * * * *